(12) United States Patent
Feierfeil et al.

(10) Patent No.: US 10,832,304 B2
(45) Date of Patent: Nov. 10, 2020

(54) RESORTING PRODUCT SUGGESTIONS FOR A USER INTERFACE

(71) Applicant: Target Brands, Inc., Minneapolis, MN (US)

(72) Inventors: Andrew J. Feierfeil, San Jose, CA (US); Joseph Owen Ruekert, Minnetonka, MN (US); Thomas Fredrick Muench, Prior Lake, MN (US); William Springer, Lakeville, MN (US); Satyajit Gupte, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 473 days.

(21) Appl. No.: 14/996,962

(22) Filed: Jan. 15, 2016

(65) Prior Publication Data

US 2017/0206583 A1 Jul. 20, 2017

(51) Int. Cl.
*G06Q 30/06* (2012.01)

(52) U.S. Cl.
CPC ..... *G06Q 30/0631* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 6,266,649 B1 | 7/2001 | Linden et al. | |
| 6,356,879 B2 | 3/2002 | Aggarwal et al. | |
| 6,370,513 B1 * | 4/2002 | Kolawa | G06Q 30/02 705/15 |
| 7,081,579 B2 | 7/2006 | Alcalde et al. | |
| 7,113,917 B2 | 9/2006 | Jacobi et al. | |
| 7,337,458 B2 | 2/2008 | Michelitsch et al. | |
| 7,437,306 B1 | 10/2008 | Bayer et al. | |
| 7,647,309 B1 | 1/2010 | Bar | |
| 7,680,959 B2 | 3/2010 | Svendsen | |
| 7,966,225 B2 | 6/2011 | Chan et al. | |

(Continued)

FOREIGN PATENT DOCUMENTS

| | | |
|---|---|---|
| EP | 1906316 A1 | 4/2008 |
| KR | 20160118644 A * | 10/2016 |

(Continued)

OTHER PUBLICATIONS

Translation of KR 20160118644 (Year: 2016).*

(Continued)

*Primary Examiner* — Michelle T Kringen
(74) *Attorney, Agent, or Firm* — Theodore M. Magee; Westman, Champlin & Koehler, P.A.

(57) ABSTRACT

A computer-implemented method includes generating a first list of products to recommend to a user. The following steps are then repeated: removing a first product from the first list and placing the first product in a second list wherein the order of the products in the second list determines the order that products appear on a user interface; and comparing each remaining product in the first list to the product placed on the second list and moving products that are similar to the product placed on the second list further down in the first list. A user interface is then generated from the second list to show suggested products to a user.

9 Claims, 10 Drawing Sheets

(56) References Cited

U.S. PATENT DOCUMENTS

| | | | |
|---|---|---|---|
| 8,065,199 | B2 | 11/2011 | Dumon et al. |
| 8,126,779 | B2 | 2/2012 | Wanker |
| 8,190,486 | B1 | 5/2012 | Ouimet |
| 8,275,666 | B2 | 9/2012 | Chang et al. |
| 8,566,256 | B2 | 10/2013 | Hueter et al. |
| 8,615,524 | B2 | 12/2013 | Kanigsberg et al. |
| 8,725,592 | B2 | 5/2014 | Batra et al. |
| 8,740,060 | B2 | 6/2014 | Aihara et al. |
| 8,762,318 | B2 | 6/2014 | Zhang et al. |
| 8,805,851 | B2 | 8/2014 | Koike et al. |
| 8,898,713 | B1 | 11/2014 | Price |
| 8,935,303 | B2 | 1/2015 | Karatzoglou et al. |
| 2004/0172267 | A1 | 9/2004 | Patel et al. |
| 2008/0294625 | A1 | 11/2008 | Takeuchi |
| 2009/0077081 | A1 | 3/2009 | Sarma et al. |
| 2009/0234712 | A1* | 9/2009 | Kolawa .................. G06Q 30/02 705/14.4 |
| 2010/0250336 | A1 | 9/2010 | Selinger et al. |
| 2010/0262495 | A1* | 10/2010 | Dumon ............. G06F 17/30979 705/14.54 |
| 2011/0010307 | A1 | 1/2011 | Bates et al. |
| 2011/0099122 | A1 | 4/2011 | Bright et al. |
| 2011/0302122 | A1 | 12/2011 | Sekino |
| 2011/0302126 | A1 | 12/2011 | Sekino |
| 2012/0173324 | A1 | 7/2012 | Vallery et al. |
| 2012/0197750 | A1* | 8/2012 | Batra ................. G06F 17/30592 705/26.7 |
| 2013/0066675 | A1 | 3/2013 | Bercaw |
| 2013/0159209 | A1* | 6/2013 | Zhao .................... G06Q 10/067 705/348 |
| 2013/0173419 | A1 | 7/2013 | Farber et al. |
| 2013/0198022 | A1 | 8/2013 | Zhang |
| 2013/0238390 | A1 | 9/2013 | Hariharan et al. |
| 2013/0325627 | A1 | 12/2013 | Kimmerling |
| 2014/0258025 | A1 | 9/2014 | Bouzid et al. |
| 2014/0279263 | A1 | 9/2014 | Liu et al. |
| 2014/0304106 | A1 | 10/2014 | Dahan |
| 2015/0058087 | A1* | 2/2015 | Kulagin ............. G06Q 30/0204 705/7.34 |
| 2015/0066952 | A1 | 3/2015 | Tavakkol et al. |
| 2015/0095322 | A1 | 4/2015 | Procopio et al. |
| 2015/0142607 | A1 | 5/2015 | Yang et al. |
| 2015/0142785 | A1 | 5/2015 | Roberts et al. |
| 2016/0070803 | A1 | 3/2016 | Nuckolls |
| 2017/0206581 | A1 | 7/2017 | Feierfeil |
| 2017/0206582 | A1 | 7/2017 | Feierfeil |

FOREIGN PATENT DOCUMENTS

| | | |
|---|---|---|
| WO | 2013181636 A2 | 12/2013 |
| WO | 2014083429 A2 | 6/2014 |
| WO | 20140134940 A1 | 9/2014 |

OTHER PUBLICATIONS

McAdams, Daniel A., Robert B. Stone, and Kristin L. Wood. "Functional interdependence and product similarity based on customer needs." Research in Engineering Design 11.1 (1999): 1-19. (Year: 1999).*

Carbonell et al., Computer Science Department, School of Computer Science, Carnegie Mellon University, http://www.cs.odu.edu/~jbollen/spring03_IR/readings/article1-29-03.pdf, Proceeding of the 21st Meeting of International ACM SIGIR Conference, Aug. 1998, pp. 335-336.

Meteren et al., Using Content-Based Filtering for Recommendation, http://citeseerx.ist.psu.edu/viewdoc/download?doi=10.1.1.130.8327&rep=rep1&type=pdf, pp. 1-10.

Pazzani et al., P. Brusilovsy et al. (Eds.): The Adaptive Web, Content-Based Recommendation Systems, http://users.ics.forth.gr/~potamias/mlnia/paper_6.pdf, LNCS 4321, 2007, pp. 325-341.

Salton et al., Department of Computer Science, Cornell University, http://repository.cmu.edu/cgi/viewcontent.cgi?article=1330&context=compsci, 1988, pp. 323-328.

Prosecution history of corresponding U.S. Appl. No. 14/996,940 including: Office Action dated Nov. 16, 2018.

Prosecution history of corresponding U.S. Appl. No. 14/996,928 including: Office Action dated Dec. 14, 2018 and Amendment dated Mar. 14, 2019.

Prosecution history of corresponding U.S. Appl. No. 14/996,940 including: Amendment dated Feb. 18, 2019.

Prosecution history of corresponding U.S. Appl. No. 14/996,940 including: Amendment After Final dated Jul. 12, 2019 and Final Rejection dated May 10, 2019.

Final Rejection from corresponding U.S. Appl. No. 14/996,928.

Prosecution history for corresponding U.S. Appl. No. 14/996,940 including: Amendment dated Aug. 7, 2019 and Office Action dated Nov. 26, 2019.

Response After Final dated Aug. 19, 2019 for corresponding U.S. Appl. No. 14/996,928.

Office Action dated Jan. 2, 2020 and Amendment dated Mar. 30, 2020 for corresponding U.S. Appl. No. 14/996,928.

Lawrence et al., Personalization of Supermarket Product Recommendations. In:Kohavi R., Provost F. (eds) Applications of Data Mining to Electronic Commerce, Springer, Boston MA, 2001.

Final Office Action dated Mar. 26, 2020 and Amendment dated Feb. 25, 2020 for corresponding U.S. Appl. No. 14/996,940.

* cited by examiner

RESORTING PRODUCT SUGGESTIONS FOR A USER INTERFACE

BACKGROUND

Online retail shopping involves consumers visiting one or more websites to select and purchase products. Users can sign into accounts on some retail websites allowing them to store their past purchases, commonly used shipping addresses and credit card information.

Some retail websites make suggestions for other products that a user may like based on products that the user views, places in their shopping cart, or actually purchases.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes generating a first list of products to recommend to a user. The following steps are then repeated: removing a first product from the first list and placing the first product in a second list wherein the order of the products in the second list determines the order that products appear on a user interface; and comparing each remaining product in the first list to the product placed on the second list and moving products that are similar to the product placed on the second list further down in the first list. A user interface is then generated from the second list to show suggested products to a user.

In a further embodiment, a processor performs steps that include removing a product from a first list of products based on a score for the product, adding the product to a second list of products, and for each product remaining in the first list of products, altering the score of the product based on similarities between the product and the product added to the second list of products. A user interface is generated to display products in the second list of products.

A system includes a memory a memory containing a first list of products, each product having an associated score and a processor. The processor generates a second list of products from the first list of products by sequentially selecting products from the first list of products to add to the second list of products based in part on a similarity between the product selected from the first list of products and the products in the second list of products. The processor then generates a user interface displaying the products in the second list of products as suggested products for a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the embodiments described below, a list of recommended products for a user is generated and displayed to the user in a user interface. To generate the list of recommended products, each product is scored based on a combination of a similarity between a product vector for the product and a user vector for a current user, the recency of the product's launch, and the likelihood that other users who also bought one or more products 'liked' by the current user would buy the product. The product vectors for each product are formed by tokenizing web pages for the product and assigning weights to the tokens based on what fields the tokens appear under within the web page. In addition, the product vector includes attributes set by a vendor or a merchant for the product in a database where each attribute is assigned a weight.

In accordance with some embodiments, the displayed list of products are initially chosen based on the combination of the product vector-user vector similarity, the recency of the product launch, and the likelihood that a person who bought a product 'liked' by the user would also buy the listed product. This initial listing is resorted so as to disperse similar items in the recommendation list. In accordance with one embodiment, the products are dispersed based on similarities between their product vectors.

Figure 1:
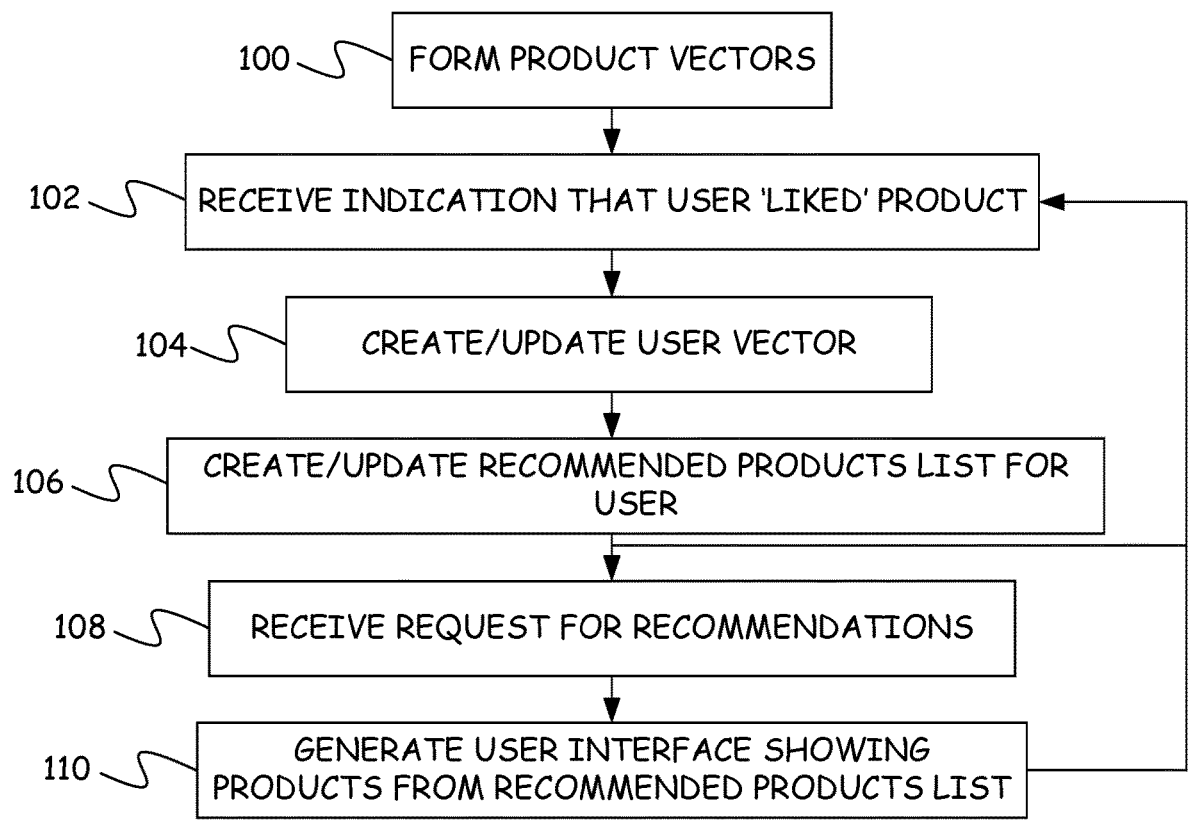
FIG. 1 provides a flow diagram for generating a user interface showing recommended products.
Figure 2:
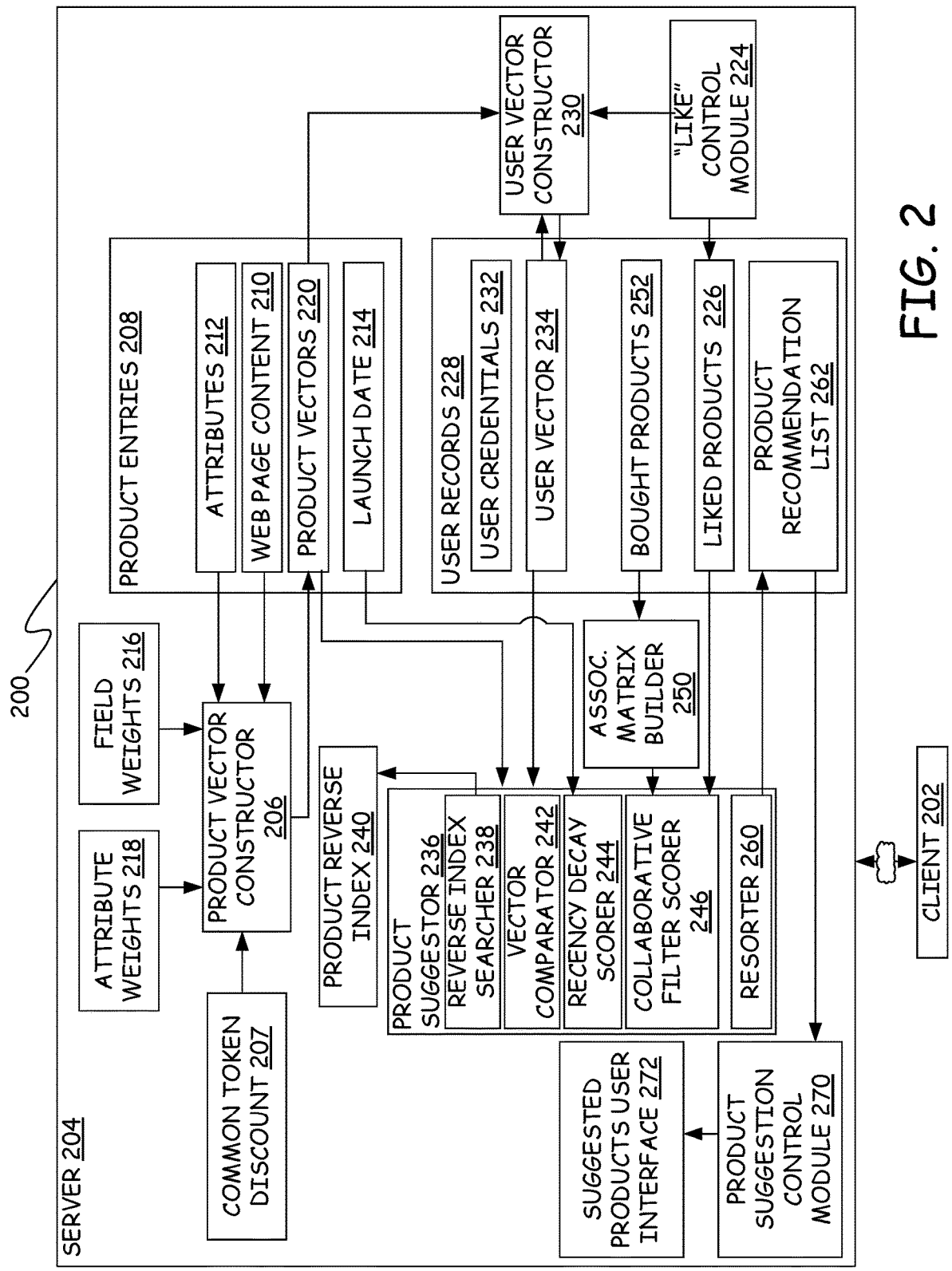
FIG. 2 provides a block diagram of elements used in the method of FIG. 1.

FIG. 1 provides a flow diagram for generating a user interface showing recommended products for a user and FIG. 2 provides a block diagram of a system 200 consisting of a client 202 and a server 204 that can be used to perform the method of FIG. 1 in accordance with some embodiments.

Figure 3:
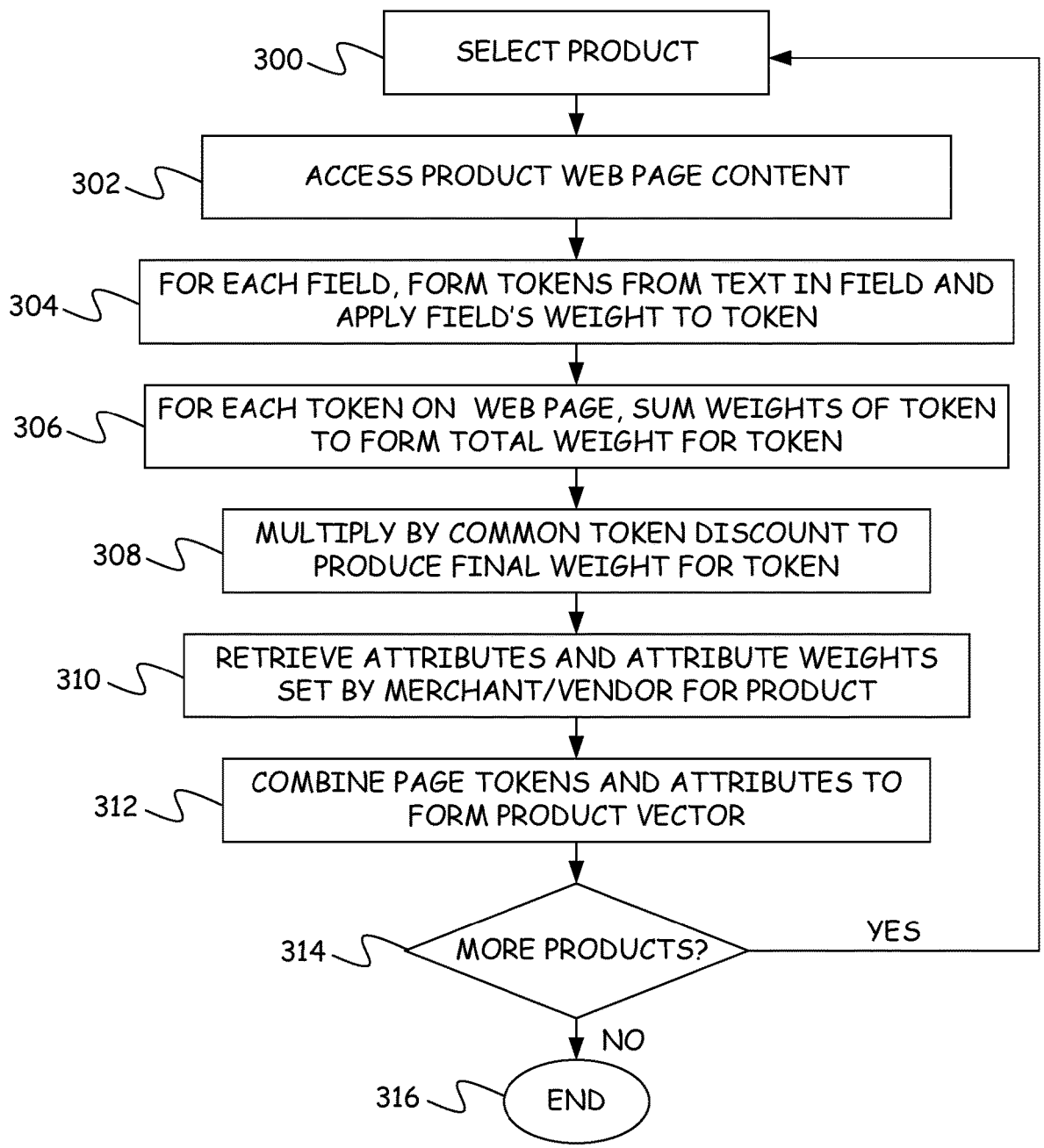
FIG. 3 provides a flow diagram for forming a product vector.

At step 100 of FIG. 1, product vectors are formed by a product vector constructor 206 on server 204. FIG. 3 provides a flow diagram for performing step 100.

At step 300 of FIG. 3, product vector constructor 206 selects a product from product entries 208. Each product entry of product entries 208 includes web page content 210 for the product, attributes 212 for the product, and a launch date 214 for the product. At step 302, product vector constructor 206 retrieves the product web page content 210, also referred to as the product web page. At step 304, for each field of the web page content 210, product vector constructor 206 forms tokens from the text in the field. In some embodiments, the text tokens are single words or terms found in each field. Product vector constructor 206 also applies a field weight to each token, where the field weight is selected from field weights 216, which provide a separate weight for each field in web page content 210.

Figure 4:
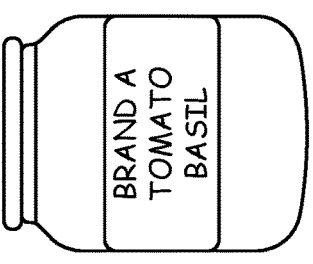
FIG. 4 provides an example of a web page for a product in accordance with some embodiments.

FIG. 4 provides an example of a web page 400 showing different fields including a title field 402 and a bullet point field 404. The view of web page 400 also includes a user review tab 406 that provides access to an additional user review field that is hidden in the view shown in FIG. 4. The web page content for web page 400 includes text and images that are shown in the view of FIG. 4 as well as the text and images that are hidden in the view of FIG. 4 but that can be accessed using one or more controls on web page 400 such as tab 406. In accordance with one embodiment, fields that are more specific or unique to a particular product are provided with a higher or larger weight than fields that are more generic and thus apply to several products. For example, in web page 400, the text tokens in title field 402 are given a greater weight than the tokens in bullet point field 404 or the tokens in the user review fields accessed through tab 406.

At step 306, for each token on the web page, the weights assigned to the token from the different fields the token appears in are summed to form a total weight for the token. Thus, if a token appears in several fields, the weights for each field are summed to form a total weight for the token. In accordance with some embodiments, if a token appears several times within a same field, it is only provided with the weight of the field once.

At step 308, each of the token weights is multiplied by a common token discount 207 to produce a final weight for the token. Common token discount 207 is specific to each token and reduces the final weight of tokens that are common in the language such as prepositions, articles and common verbs such that common words are weighted less than uncommon words.

At step 310, product vector constructor 206 retrieves attributes 212 from product entries 208 for the product. Product vector constructor 206 then retrieves the weights for the attributes of the product from attribute weights 218. Attributes for the products can include things such as colors, sizes, brands, price, genre and so forth. The attributes 212 for the product and the attribute weights 218 can be set by the retail merchant or by the producer or vendor of the product. Attributes 212 are stored separately from web page content 210.

At step 312, the web page tokens and the attributes along with their weights are used to form a product vector 220 that will be stored in the product entry 208 for the product. In accordance with one embodiment, each unique web page token and each attribute form a separate dimension of the product vector. In addition, the web page token dimensions are weighted by the final weight determined at step 308 for the web page token and the attribute dimensions are weighted by the attribute weights. Once the product vector is constructed, it is stored as product vector 220 in product entries 208 for the product.

At step 314, product vector constructor 206 determines if there are more products. If there are more products, product vector constructor 206 returns to step 300 and selects a new product. Steps 302-312 are then repeated for the new product. When there are no more products at step 314, the process ends at step 316. The process of FIG. 3 results in a separate product vector for each of a plurality of products available on the retail site.

Returning to FIG. 1, after the product vectors have been formed at step 100, a "like" control module 224 in server 204 receives an indication that a user has selected a "like" control on a web page to convey that they like a product. For example, in FIG. 4, web page 400 includes a like control 408 that when selected by the user causes an identifier for the product to be sent to "like" control module 224, which stores the product identifier as a liked product 226 in user records 228 for the user. In accordance with one embodiment, the indication that a user has "liked" a product or item is received without receiving an indication that the user purchased the product or item.

Figure 5:
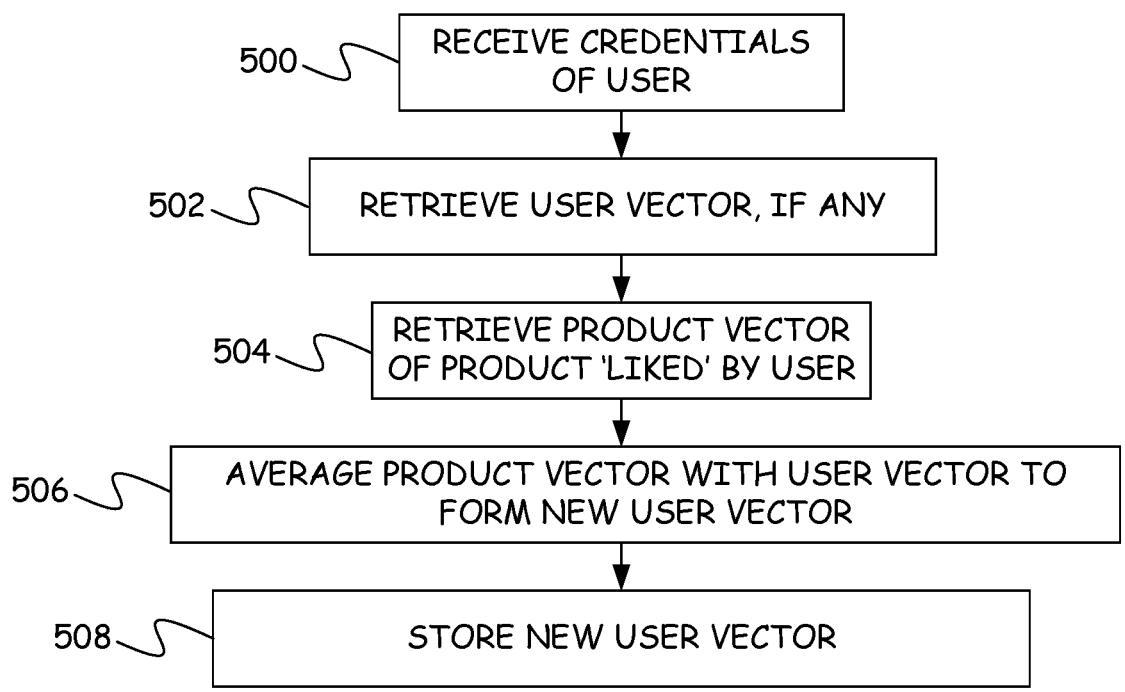
FIG. 5 provides a flow diagram for forming a user vector.

At step 104, a user vector constructor 230 creates or updates a user vector based on the received indication that the user liked a product. FIG. 5 provides a flow diagram of a method for creating or updating a user vector at step 104.

In step 500 of FIG. 5, user vector constructor 230 receives credentials of the user such as a user ID if the credentials had not been previously received. The user's credentials are used to search user records 228 to find a user record that contains user credentials 232 that match the provided user credentials. At step 502, user vector constructor 230 retrieves a user vector 234 from the user record 228 if a user vector was previously constructed for the user. At step 504, user vector constructor 230 retrieves the product vector 220 of the product liked by the user. At step 506, user vector constructor 230 averages the product vector retrieved at step 504 with the current user vector 234 to form a new or updated user vector. If there was no previous user vector 234, the retrieved product vector is set as the user vector. At step 508, the created or updated user vector is stored back to user records 228 as user vector 234.

Returning to FIG. 1, after the user vector is created or updated, a list of recommended products for the user is created or updated at step 106 by a product suggestor 236.

Figure 6:
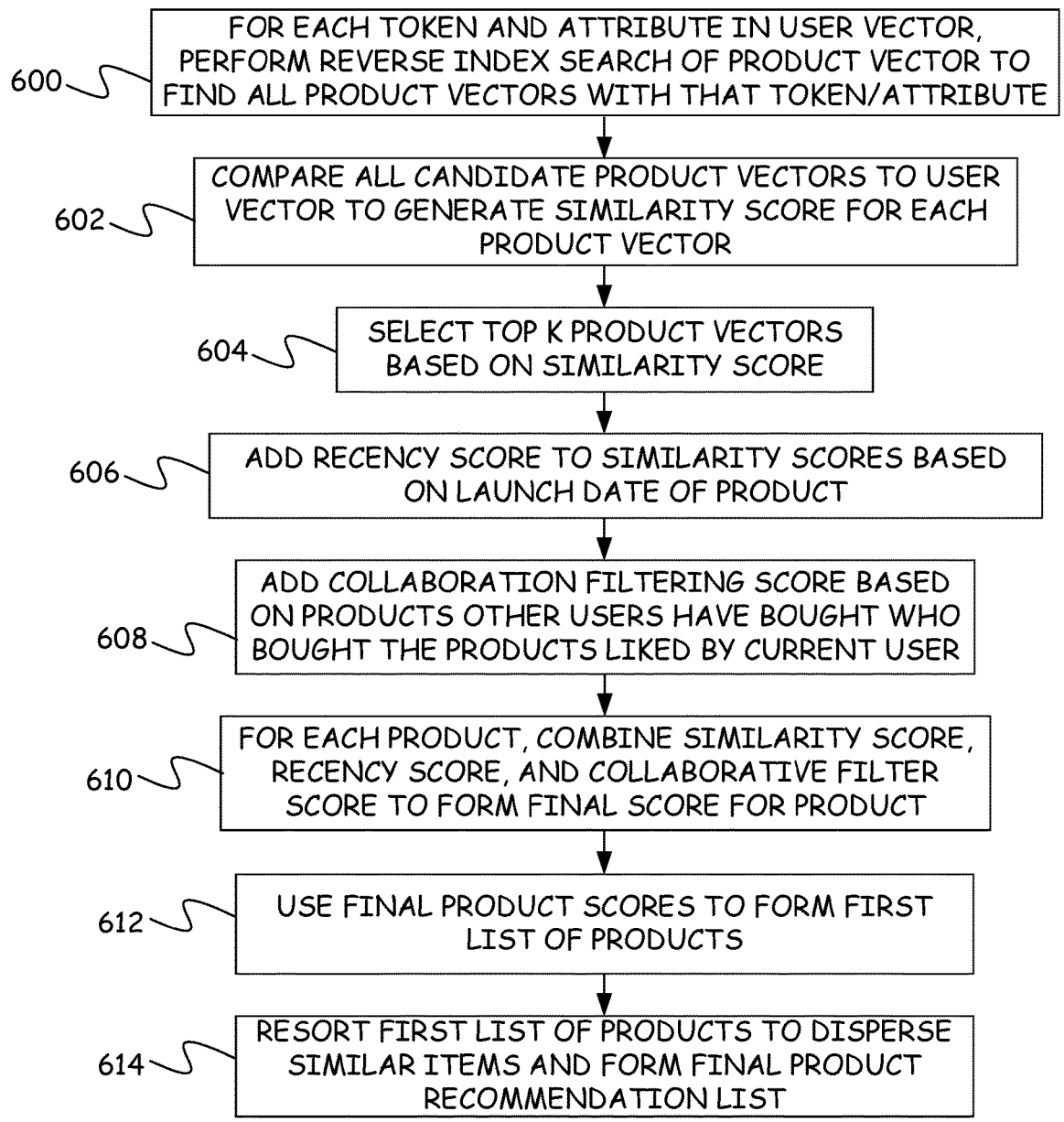
FIG. 6 provides a flow diagram for creating an ordered list of recommended products for a user.

FIG. 6 provides a flow diagram for creating a suggested product list for a user. At step 600, a reverse index searcher 238 performs a search of a product reverse index 240 to identify all of the product vectors that contain at least one dimension of the user vector such as one of the tokens or attributes in the user vector. In other words, the search of product reverse index 240 is performed to locate all product vectors that have at least one dimension in common with the user vector. At step 602, the product vectors identified in step 600 are compared to user vector 234 by a vector comparator 242 of product suggestor 236. In accordance with one embodiment, this comparison involves a cosine similarity comparison. The comparison of step 602 generates a similarity score for each product vector based on the similarity between the user vector and the product vector.

At step 604, a subset of product vectors, such as the top k product vectors, based on similarity scores are selected where k is from 2-50 in accordance with some embodiments. In selecting the top k product vectors, product suggestor 236 is ensuring that the similarity score for the selected products is sufficiently high to warrant determining a recency score and a collaborative filter score for the product vector as determined below. By limiting the calculation of the recency score and collaborative filter score to only the top k product vectors, these embodiments improve the operation of the server by reducing the number of operations that the server must perform.

At step 606, a recency decay function is applied to the similarity scores to alter the similarity scores so that scores for products that are more recently launched are increased relative to scores for products that were launched less recently. In particular, for each product of the top k products, a launch date 214 for the product is retrieved from product entries 208 by recency decay scorer 244, which also receives the similarity scores for the k products. The launch date represent the date a product was made available to consumers at a retailer. Recency decay scorer 244 uses the launch dates to determine a recency score for each product then combines the recency score with the similarity score to form a new score for the top k products.

At step 608, a collaborative filter score 246 in product suggestor 236 determines a collaborative filtering score for each of the k products. In accordance with one embodiment, the collaborative filtering score for a product is based on the likelihood that other consumers who bought a product liked by the current user would also buy the current product. In particular, an association matrix builder 250 examines lists of bought products 252 of all the users in user records 228 and identifies a category association matrix that indicates the relative likelihood of a user buying one category of products if they have bought a product in another category of products. Collaborative filter score 246 uses the category association matrix produced by association matrix builder 250 and the list of products liked 226 by the user to provide a likelihood score for each of the k products that indicates the likelihood that other users would buy a product or item from this product's category given the category of a product or item liked by the current user. In accordance with one embodiment, each product will receive a separate collaborative filtering score for each product liked by the user and these separate collaborative scores will be combined to form a single collaborative filter score for each of the k products.

At step 610, product suggestor 236 combines the similarity score, the recency score and the collaborative filter score to form a final product score or total score for each of the k products. In one embodiment, combining the scores involves adding the similarity score, the recency score and the collaborative filter score together.

At step 612, the final product scores are used to form a first list of products to display on the recommendation web page. In accordance with some embodiments, the first list of products is viewed as an ordered list of products with the product with the highest final product score at the top, referred to as the top product, and the product with the lowest final product score at the bottom.

Figure 7:
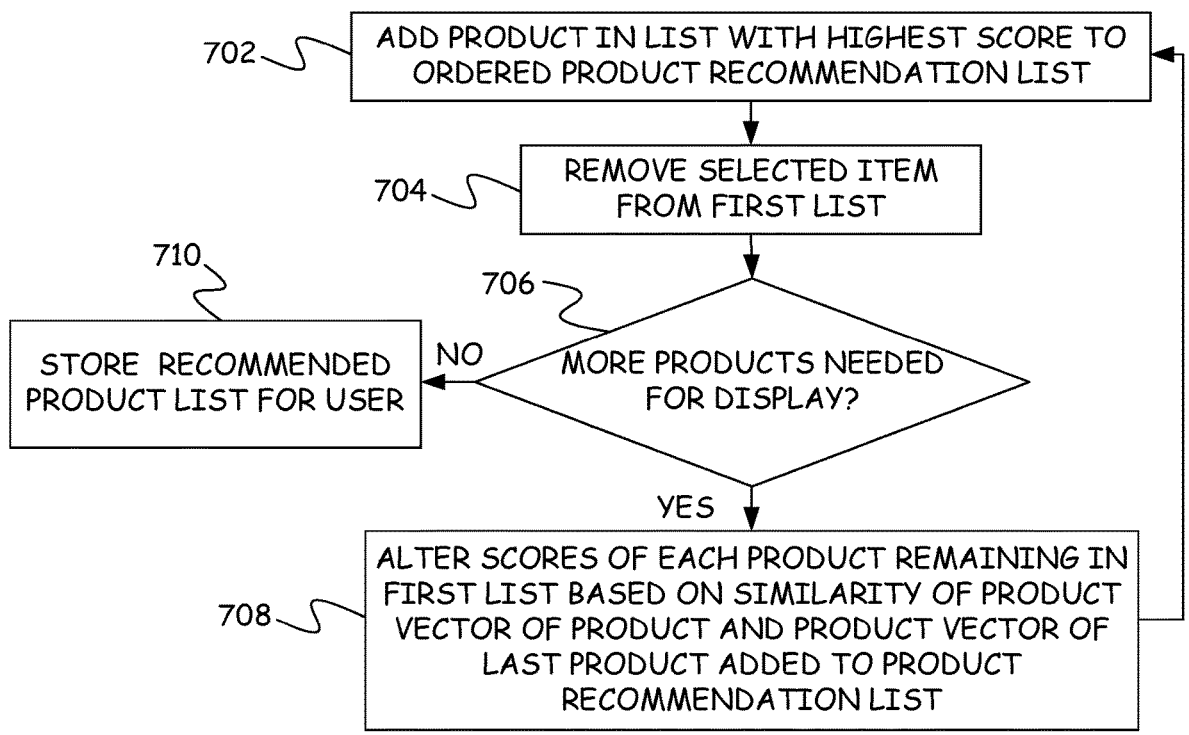
FIG. 7 provides a flow diagram for resorting products to form a recommended product list.

At step 614, the products in the first list are rescored to disperse similar items to form the final product recommendation list 262, which is also referred to as a second list. The method of step 614 is shown in the flow diagram of FIG. 7.

At step 702, the product with the highest score in the first list, the top product, is selected as the next product to add to ordered product recommendation list 262 by a resorter 260. If there is no ordered product recommendation list 262 yet, the selected product is inserted as the first product in ordered product recommendation list 262. When the product is added to product recommendation list 262 it is added to the end of product recommendation list 262 so that the order the products are added to product recommendation list 262 is maintained with product recommendation list 262. At step 704, the product added to product recommendation list 262 is removed from the first list.

At step 706, resorter 260 determines if more products are needed for product recommendation list 262. If more products are needed, resorter 260 updates or alters the scores of the products remaining in the first list at step 708 by reducing the scores of products based on the similarity of the product vectors of each product to the product vector of the last product added to product recommendation list 262. Thus, if a product in the first list has a product vector that is similar to the product vector of the product last added to product recommendation list 262, its score is reduced more than the score for a product that has a product vector that is not as similar to the product vector of the last product added to product recommendation list 262. In accordance with one embodiment, a similarity score is determined using a cosine function and the similarity score is subtracted from the previous score for the product to form the altered score for the product. Viewing the first list as an ordered list with the highest scoring product at the top of the list, altering the scores of the products in the first list based on the similarities between the products and the last product added to product recommendation list 262 causes products that are similar to the last product placed on product recommendation list 262 to move further down in the first list.

After step 708, the process returns to step 702 where the product in the first list with the highest altered score is selected as the next product to add to product recommendation list 262. Steps 702, 704, 706 and 708 are repeated until no more products are needed to be added to product recommendation list 262. For example, in some embodiments, the number of products that can be displayed is limited such that when the limit is reached, no further products need to be added to product recommendation list 262. When no more products are needed to be added to product recommendation list 262 at step 706, resorter 260 stores product recommendation list 262 in user records 228 at step 710.

Returning to FIG. 1, after resorter 260 has created product recommendation list 262 at step 106, the process of FIG. 1 splits in parallel to steps 102 and step 108. In step 102, the process waits to receive an indication that the user has liked another product and in step 108, the process waits to receive a request for recommendations from the user.

Figure 8:
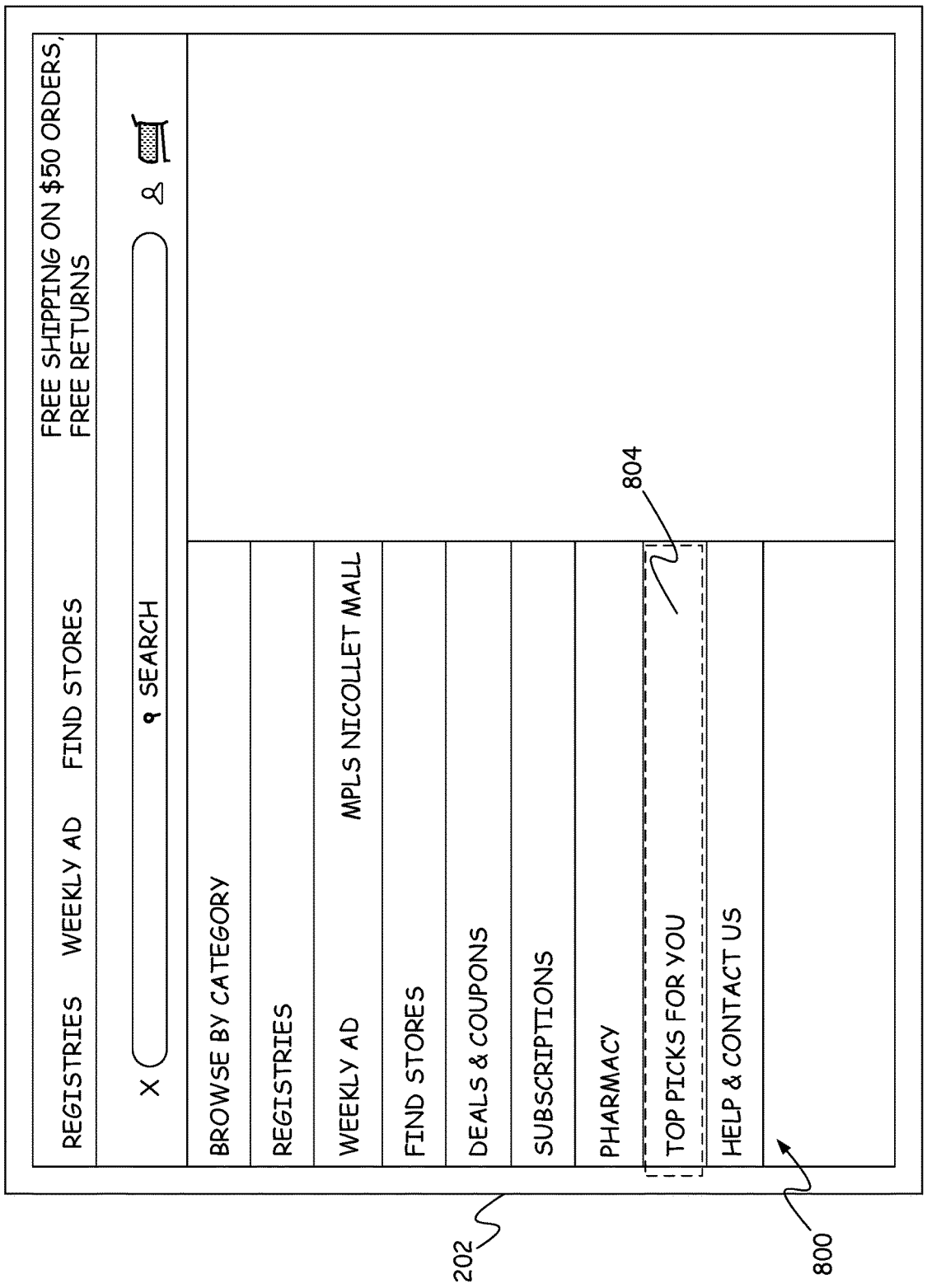
FIG. 8 provides an example user interface allowing a user to select a control to request recommendations for the user.

FIG. 8 provides an example of a user interface 800 displayed on client device 202, such as a display of a computing device or a mobile device. User interface 800 includes a product suggestion request control 804 that allows a user to request "top picks for you". When a user selects control 804, client device 202 sends a request to product suggestion control module 270 on server 204 to request product recommendations for the current user.

Upon receiving this request at step 108, product suggestion control module 270 accesses product recommendation list 262 for the current user and uses the product recommendation list 262 to generate a suggested product user interface 272 at step 110. In particular, the order of the products in product recommendation list 262 is used to set or select the position of the products in user interface 272 such that products higher in product recommendation list 262 are displayed closer to the top of user interface 272. Since the product's position in product recommendation list 262 is based in part on the final product score or total score, the position of the product in the user interface is selected based in part on the final product score or total score.

Figure 9:
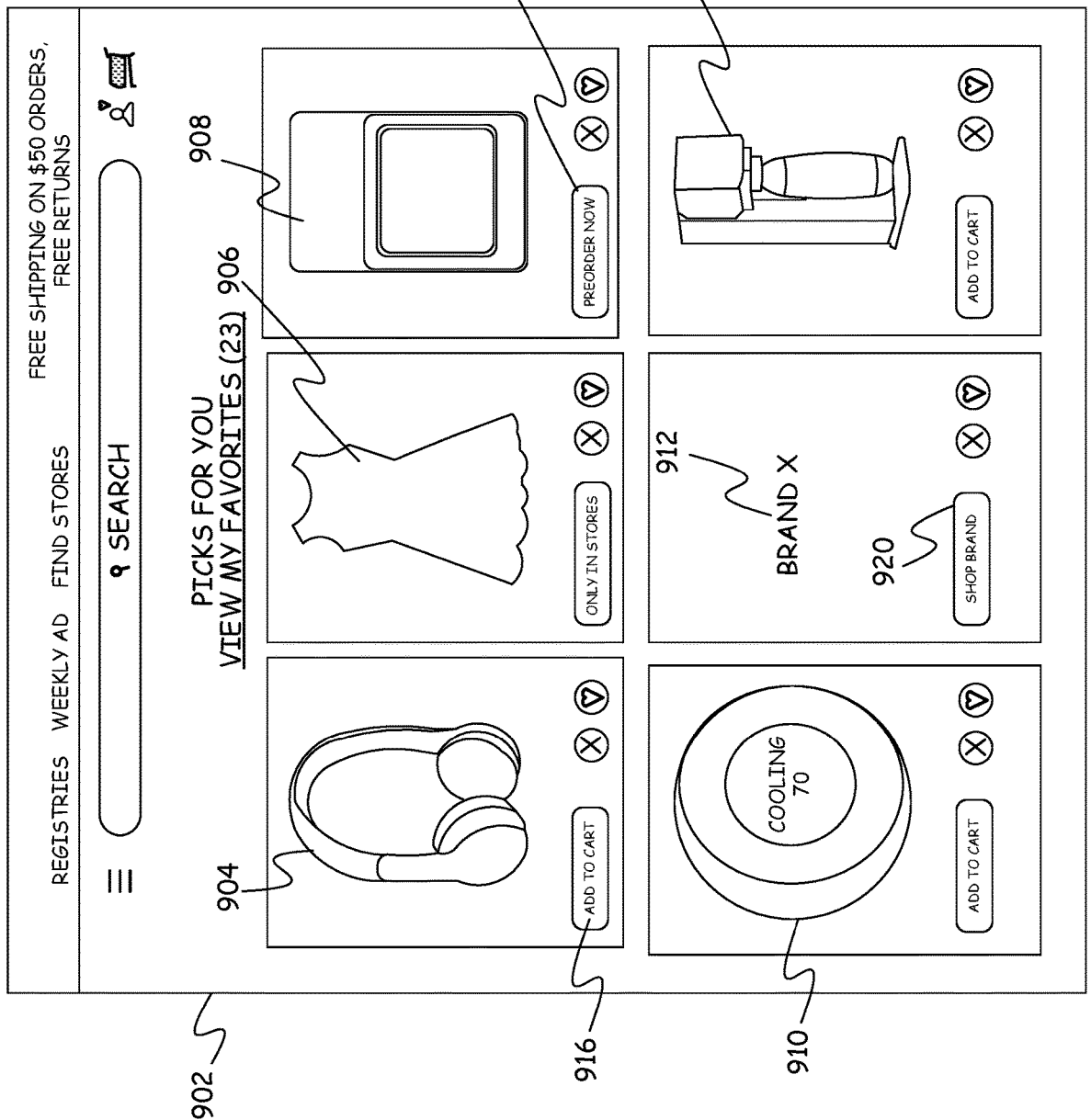
FIG. 9 provides a user interface showing a list of recommended products provided to a user.

FIG. 9 provides an example of a user interface 900 on a display 902, which for example can be a display on a computing device or a mobile device. User interface 900 includes an ordered list of suggested products for the current user, such as products 904, 906, 908, 910, 912 and 914. In accordance with the embodiment shown in FIG. 9, the user interface can display pictures of the product as well as one or more controls related to the product, such as a control 916 to add the product to the user's current shopping cart, a pre-order control, such as control 918 to allow a user to place an order for a product that is not yet available and a shop brand controls, such as control 920 to allow the user to shop for all products in a brand. The shop brand control 920 is made available when the product listed is for an entire brand instead of for a single product within the brand. Products 904, 906 and 908 are positioned higher in product recommendation list 262 than products 910, 912 and 914.

Figure 10:
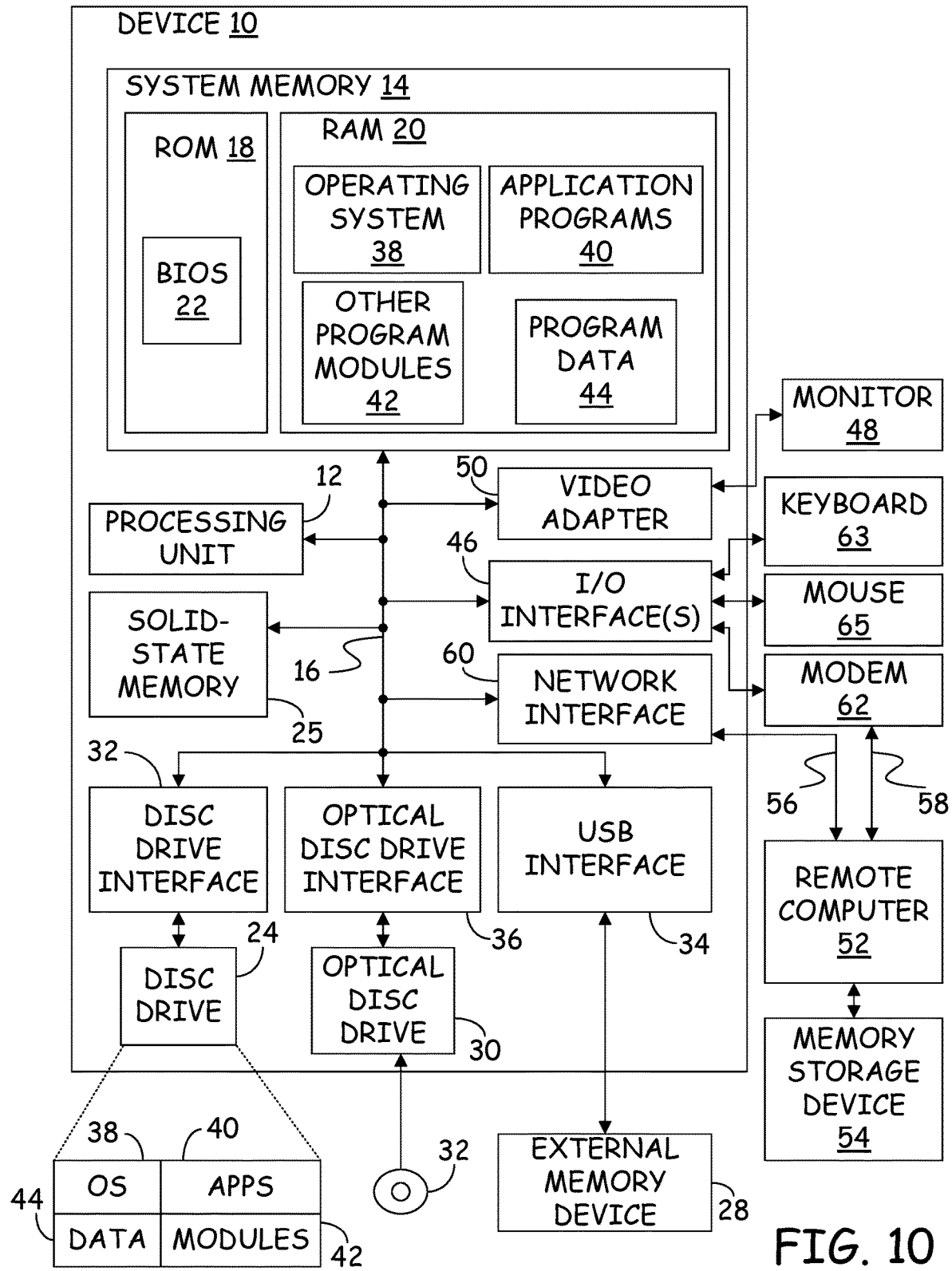
FIG. 10 provides a block diagram of a computing device that may be used in the several embodiments.

FIG. 10 provides an example of a computing device 10 that can be used as a server device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing product suggestor 236, product vector constructor 206, user vector constructor 230, "like" control module 224, product suggestion control module 270 and association matrix builder 250 Program data 44 may include data such as product entries 208, user records 228, suggested products user interface 272.

Processing unit 12, also referred to as a processor, executes programs in system memory 14 and solid state memory 25 to perform the methods described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 10. The network connections depicted in FIG. 10 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 10 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
   receiving an identifier for a product together with an indication that a control on a web page has been selected by a user;
   updating a user vector for the user based on the selection of the control and the identifier for the product;
   generating a first list of products to recommend to the user using a respective product vector for each product to produce a score for each product in the first list of products, wherein each respective score is based in part on a similarity between the respective product vector for the respective product and the user vector for the user, each product vector having multiple dimensions, with a plurality of the multiple dimensions representing respective tokens found on a respective web page for the respective product wherein the products of the first list are ordered based on the score for each product;
   removing a product having a highest score from the first list and placing the product having the highest score in a second list wherein the order of the products in the second list determines the order that products appear on a user interface;
   comparing each remaining product in the first list to the product placed on the second list by comparing the multiple dimensions of the respective product vector of each remaining product in the first list to the multiple dimensions of the product vector of the product placed on the second list to produce a similarity score for each remaining product in the first list such that a product that is more similar to the product placed on the second list has a higher similarity score;

for each remaining product in the first list, subtracting the similarity score for the respective remaining product from the respective score for the respective remaining product to form a new score for the respective remaining product;

removing a remaining product having a highest new score from the first list and placing the product having the highest new score in the second list; and receiving a request from a client device for a list of recommended products and in response generating a user interface from the second list to show suggested products to a user wherein a number of products that can be displayed on the user interface is limited and such that similar products in the second list are dispersed on the user interface among the limited number of products shown on the user interface.

2. A non-transitory computer-readable medium having computer-executable instructions stored thereon that when executed by a processor causes the processor to perform steps comprising:

receiving an identifier for a product together with an indication that a control on a web page has been selected by a user;

updating a user vector for the user based on the selection of the control and the identifier for the product;

scoring each product in a first list of products based in part on a similarity between a product vector for the product and the user vector for the user;

removing a product from the first list of products that has a highest score;

adding the product that has the highest score to a second list of products;

for each product remaining in the first list of products, reducing the score of the product based on similarities between multiple dimensions of the product vector for the product and multiple dimensions of the product vector for the product added to the second list of products wherein a plurality of the multiple dimensions of each product vector represent respective tokens found on a respective web page for the respective product;

wherein a first product and a second product are remaining in the first list of products and a product vector of the first product is more similar to the product vector for the product added to the second list than a product vector of the second product is to the product vector for the product added to the second list such that a respective score for the first and second product are both reduced with the score for the first product being reduced more than the score for the second product; and receiving a request from a client device for a list of recommended products and in response generating a user interface to display products in the second list of products wherein the user interface is limited to displaying a limited number of products and such that similar items in the second list of products are dispersed on the user interface among the limited number of products on the user interface.

3. The non-transitory computer-readable medium of claim 2 wherein adding the product to the second list of products comprises adding the product to an end of the second list of products.

4. The non-transitory computer-readable medium of claim 3 wherein generating a user interface to display products in the second list of products comprises placing products from the second list of products in the user interface based on the order of the products in the second list of products.

5. The non-transitory computer-readable medium of claim 2 further comprising removing a second product from the first list based on the second product having the largest reduced score and adding the second product to the second product list.

6. The non-transitory computer-readable medium of claim 5 further comprising for each product remaining in the first list of products after the second product is removed, reducing the score of the product based on similarities between multiple dimensions of the product vector of the product and multiple dimensions of the product vector of the second product added to the second list of products.

7. The non-transitory computer-readable medium of claim 2 wherein removing a product from a first list of products based on a score for the product and adding the product to a second list of products is repeated until the first list of products is empty.

8. A system comprising:

a memory containing a respective multiple-dimension product vector for each of a plurality of products, wherein a plurality of the multiple dimensions represent respective tokens found on a respective web page for the respective product;

a processor configured to:

receiving an identifier for a product together with an indication that a control on a web page has been selected by a user;

updating a user vector for the user based on the selection of the control and the identifier for the product;

generating a first list of products by scoring each of the plurality of products based in part on a similarity between the product vector for the respective product and the user vector for the user;

generate a second list of products from the first list of products by sequentially selecting products from the first list of products to add to the second list of products;

wherein sequentially selecting products from the first list of products comprises selecting a product from the first list of products with a highest score, after selecting a product from the first list of products, removing the product from the first list of products, adding the product to the second list of products, and reducing the score of each product remaining in the first list of products based on a similarity between the respective product vector of each product in the first list of products and the product vector of the product removed from the first list of products such that a score for a first product in the first list of products and a score for a second product in the first list of products are both reduced with the score for the first product reduced more than the score for the second product, wherein the product vector for the first product is more similar to the product vector of the product removed from the first list than the product vector of the second product is to the product vector of the product removed from the first list;

receive a request from a client device for a list of recommended products; and generate a user interface displaying a limited number of suggested products for a user where the limited number of products are taken from the products in the second list of products such that similar suggested products are dispersed on the user interface among the limited number of suggested products on the user interface.

9. The system of claim 8 wherein generating a user interface displaying the products in the second list of products comprises generating the user interface such that products appear in the user interface in the order in which the products were added to the second list of products.

\* \* \* \* \*